United States Patent [19]

Kundmann

[11] Patent Number: 5,495,505
[45] Date of Patent: Feb. 27, 1996

[54] INCREASED FREQUENCY RESOLUTION IN A SYNTHESIZER

[75] Inventor: Thomas J. Kundmann, Streamwood, Ill.

[73] Assignee: Motorola, Inc., Schaumburg, Ill.

[21] Appl. No.: 630,708

[22] Filed: Dec. 20, 1990

[51] Int. Cl.$^6$ .............................. H04L 27/20; H04L 27/12
[52] U.S. Cl. .................................... 375/308; 375/303
[58] Field of Search ............................ 375/272, 279, 375/303, 308; 331/1 H, 10, 12, 15, 25; 327/105; 332/100, 101, 103, 104; 455/42, 110, 113, 118; 364/705.05, 718, 721

[56] References Cited

U.S. PATENT DOCUMENTS

| | | | |
|---|---|---|---|
| 4,053,739 | 10/1977 | Miller et al. | 364/703 |
| 4,179,670 | 12/1979 | Kingsbury | 331/10 |
| 4,204,174 | 5/1980 | King | 331/10 |
| 4,758,802 | 7/1988 | Jackson | 375/120 |
| 4,800,342 | 1/1989 | Jackson et al. | 331/101 |
| 4,815,018 | 3/1989 | Reinhardt et al. | 364/701 |
| 4,893,316 | 1/1990 | Jane et al. | 375/271 |
| 4,901,265 | 2/1990 | Kerr et al. | 328/14 |
| 4,962,510 | 10/1990 | McDavid et al. | 375/308 |
| 4,965,531 | 10/1990 | Riley | 331/25 |
| 4,965,533 | 10/1990 | Gilmore | 331/25 |
| 4,984,186 | 1/1991 | Moerder | 364/721 |
| 4,998,072 | 3/1991 | Sheffer | 328/14 |
| 5,045,817 | 9/1991 | Sheffer | 375/303 |
| 5,073,869 | 12/1991 | Bjerede | 364/718 |
| 5,122,762 | 6/1992 | Molina et al. | 331/1 A |

FOREIGN PATENT DOCUMENTS

| | | |
|---|---|---|
| 0459446 | 5/1990 | European Pat. Off. . |
| 90/06624 | 6/1990 | WIPO . |

Primary Examiner—Young T. Tse
Attorney, Agent, or Firm—Richard A. Sonnentag

[57] ABSTRACT

A direct digital frequency synthesizer increases the frequency resolution of the analog output signal by using fractionalization techniques. The best integer value $I_{FR}$ of a digital signal is determined and the next integer value $I_{FR}+1$ of a digital signal is used to determine a weighted fractionalized value of the digital signal. The fractionalized value of the digital signal is used to synthesize the analog output signal having increased frequency resolution. In addition, IFR and IFR+1 are optimally distributed during the weighting process to ensure a minimum cumulative phase error.

26 Claims, 2 Drawing Sheets

DIGITAL RADIOTELEPHONE TRANSMITTER ns5,495,505

INCREASED FREQUENCY RESOLUTION IN A SYNTHESIZER

FIELD OF THE INVENTION

This invention relates generally to frequency synthesizers and more particularly to a direct digital synthesizer incorporating fractionalization to increase frequency resolution.

BACKGROUND OF THE INVENTION

With radiotelephone systems moving into digital data transfer instead of audio-type data transfer, direct digital synthesis is an ideal adaptation of converting analog technology into digital technology. In a direct digital synthesizer (DDS), a known non-return to zero (NRZ) data stream representing a predetermined sequence is input into a DDS modulator resulting in a corresponding analog signal. The analog signal can either be modulated or unmodulated depending on the NRZ data stream representation.

The DDS is ideal and very well suited for use in the transmitters of digital radiotelephone systems. These transmitters generally require high stability and increased frequency accuracy than do their typical analog counterparts. Reproducability of a typical quadrature modulated signal is also a problem in the transmitters of digital radiotelephone systems. Using analog-to-analog synthesizers typically leads to various adjustments required for such things as DC offset and input analog signal amplitude adjustment. With DDS modulators incorporated in the transmitters of digital radiotelephone system, the requirements of stability and reproducability are inherent in the DDS modulator itself.

Due to the requirements of wide frequency coverage and fine frequency resolution, phase accumulators that are typically employed in DDS modulators generally are required to be quite long. This requirement comes about due to the fact that more bits are required to realize the fine frequency resolution that digital radiotelephone systems require. Large phase accumulators tend to make transmitter circuitry complex which in turn may become very expensive. Also, to minimize part count and ensure the use of common parts throughout the radiotelephone system, an engineering compromise must be made as to the type and quantity of parts that are used.

Thus, a need exists for a direct digital synthesizer having an increased effective frequency resolution without increasing phase accumulator length, thus making the DDS hardware simpler and frequency modulation easier to implement.

SUMMARY OF THE INVENTION

A frequency synthesizer has increased frequency resolution of an analog output signal, the analog output signal being synthesized in accordance with a digital control signal. The frequency synthesizer comprise a means for distributing a first digital input signal for a first fractional interval N and a second digital input signal for a second fractional interval D–N and a means, coupled to the means for distributing, for synthesizing the analog output signal.

DETAILED DESCRIPTION OF A PREFERRED EMBODIMENT

Figure 1:
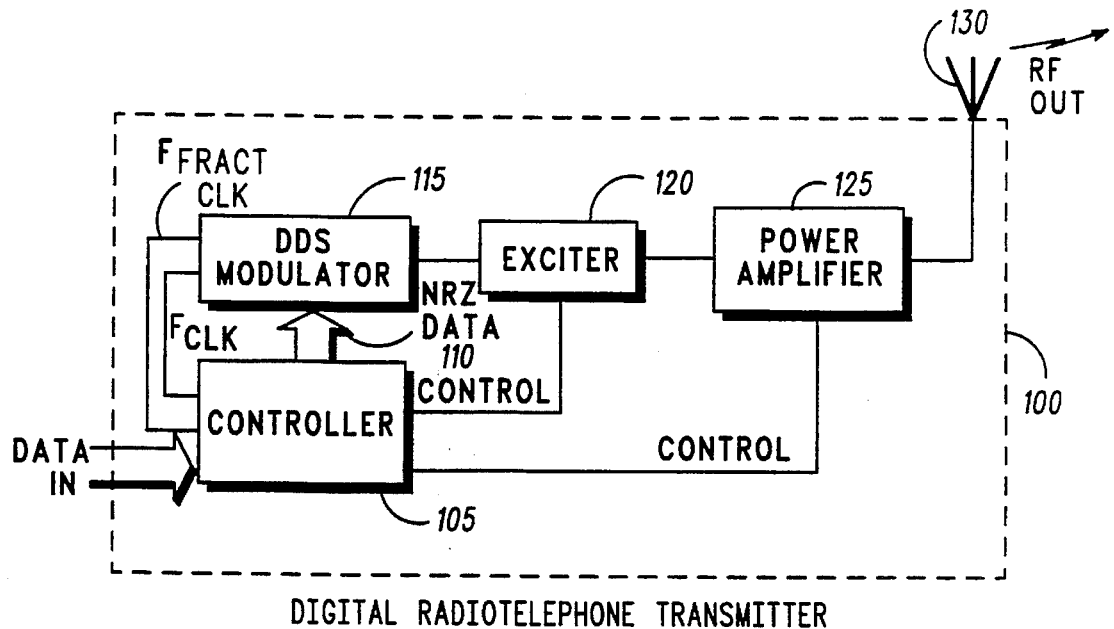
FIG. 1 generally depicts a digital radiotelephone transmitter which may employ a DDS modulator in accordance with the present invention.

FIG. 1 generally depicts a digital radiotelephone transmitter that may employ the present invention. The transmitter 100 is comprised of a controller 105 which essentially receives data from external equipment and distributes the data to the appropriate section in the transmitter 100. The controller 105 may be a microprocessor such as a Motorola 6800 and may also include a digital signal processor (DSP) such as a Motorola 68030. Continuing, the controller 105, having received data from external equipment, distributes non-return to zero (NRZ) data 110 to a DDS modulator 115. The NRZ data essentially represents voice data which a transmitter 100 receives from external equipment and is required to transmit to a user. The DDS modulator 115 receives the NRZ data and generates an analog output signal which is input into an exciter 120, which is essentially a low power amplifier. The controller 105 controls the exciter 120 depending upon the required output. A power amplifier 125 receives the output from the exciter 120 and amplifies the radio frequency (RF) signal which is then output over a typical antenna 130.

Figure 2:
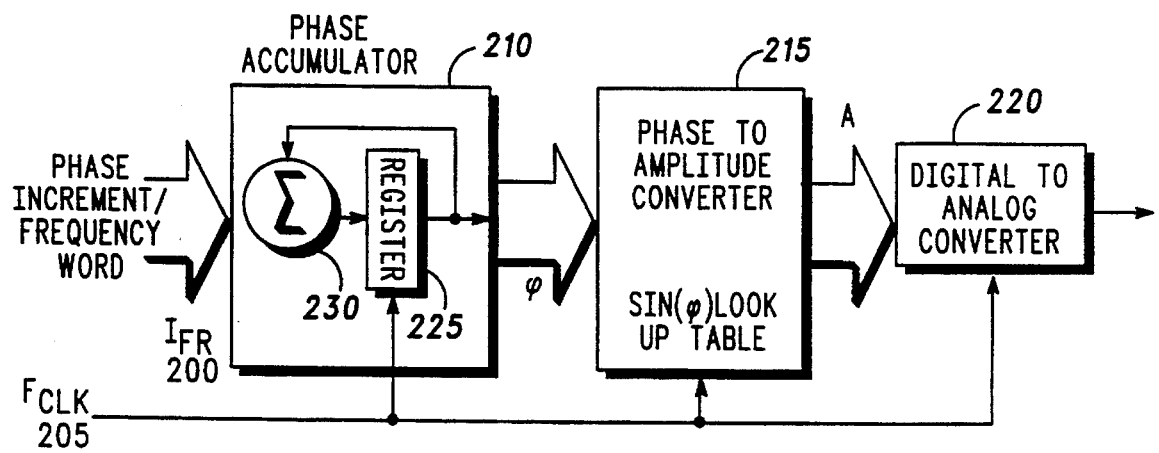
FIG. 2 generally illustrates a prior art direct digital synthesizer (DDS) having limited resolution.

FIG. 2 generally depicts a direct digital synthesizer (DDS) in accordance with the present invention. The DDS has as input a P-bit word, which is a digital input signal which represents a phase increment/frequency word and is called $I_{FR}$ 200. $I_{FR}$ 200 is input into a phase accumulator 210 which also has as input a clock frequency given by $F_{CLK}$ 205. In the preferred embodiment, P is a 16-bit long word and $F_{CLK}$ 205 is 35.1 MHz. The phase accumulator 210 accepts the 16-bit word $I_{FR}$ 200 where the input is put in to a P-bit register 225, again where P is 16 in the preferred embodiment. The clock signal $F_{CLK}$ 205 clocks in the signal $I_{FR}$ 200 into the register 225 which then outputs the signal $I_{FR}$ 200 into a conventional adder 230. In this manner, the required phase corresponding to the integer value of $I_{FR}$ 200 is generated by the phase accumulator 210. Output of the phase accumulator 210 is a 16-bit phase word which is input into a phase-to-amplitude converter 215. The phase-to-amplitude converter 215 is essentially a converter which takes the sine of the phase word. The phase-to-amplitude converter 215, which in the preferred embodiment is a typical ROM, stores a look-up table which has a predetermined amplitude output for a corresponding phase word input, and outputs a digital control signal. The predetermined amplitude output of the desired signal is then input into a digital-to-analog converter 220 which transforms the amplitude output into an analog output signal.

The DDS shown in FIG. 2 has limited resolution particularly due to the clock signal $F_{CLK}$ 205 and the length of the register 225 in the phase accumulator 210. With this in mind, the smallest phase resolution achievable by the DDS is $$\phi_{RES} = 2\pi/2^P \text{ radians}$$

and the smallest frequency step achievable by the DDS is $$F_{RES} = F_{CLK}/2^P \text{ Hz}$$

which intuitively makes sense since $F_{CLK}$ is the maximum frequency that can be achieved and $2^P$ is the largest integer value that can be achieved with a P-bit phase increment/frequency word. The phase accumulator 210 increment value is given by $$\Delta\phi = \phi_{RES} \times I_{FR}$$

again where $I_{FR}$ 200 is the phase increment/frequency word applied to the phase accumulator 210 input. With these equations in hand, the output frequency of the DDS is given by $$F_{DDS} = \Delta\phi/\Delta T = (I_{FR})(F_{RES}) = (F_{CLK})(I_{FR}/2^P) \text{ Hz.}$$

From these results, it is apparent that for a fixed $F_{CLK}$ 205, increased frequency resolution can only be achieved by increasing the number of bits in the phase increment/frequency $I_{FR}$ 200.

This invention overcomes the above mentioned limitation by varying the $I_{FR}$ 200 value between two adjacent states. This generates an average DDS output frequency which has an effective $I_{FR}$ value with a fractional part. This fraction process can be described as follows. Assume that the fractionalization is controlled by some constant rate, F, which is an arbitrary integer divisor of $F_{CLK}$ and $<F_{CLK}/2$. $F_{FRACT}$ is chosen to be $<F_{CLK}/2$ to ensure at least one accumulation of the $I_{FR}$ or $I_{FR}+1$ value for that fractionalization interval, the fractionalization interval given by $$T_{FRACT} = 1/F_{FRACT}.$$

Furthermore, defining $$I_{FRACT} = I_{FR} + N/D$$

where I is the integer portion of the fractional frequency word and N and D are the numerator and denominator of the fractional part respectively, the frequency resolution is increased by a factor of D and is given by $$F_{RES} = F_{CLK}/(D \times 2^P) \text{ Hz.}$$

This fractional process is achieved by cycling through a fractional period which consists of D fractional intervals. During this period, $I_{FR}$ is set to I+1, which represents a first digital input signal, for N fractional intervals and set to I, which represents a second digital input signal, for the remaining D–N intervals.

The concept of weighting the value of $I_{FR}$ for a fractionalized interval is best explained by example. Assume that the analog output signal is required to be 7.200000 MHZ±2 Hz. Based on the parameters of the preferred embodiment, namely P=16 and $F_{CLK}$=35.1 MHz, the best value for $I_{FR}$=13443, which results in the following output frequency $$F_{DDS} = (F_{CLK})(I_{FR}/2^P) \text{ Hz} = 7.199849 \text{ MHz}$$

In order to achieve the desired frequency accuracy, fractionalization was implemented using the following parameters: $I_{FR}$=13443, N=72 and D=256. Thus $$I_{FRACT} = 13443 + (72/256) = 13443.28125$$

and $$F_{DDS} = (F_{CLK})(I_{FRACT}/2^P) \text{ Hz} = 7.1999996 \text{ Hz}$$

which exhibits a frequency error of 0.4 Hz. $I_{FRACT}$ is essentially a weighted average of $I_{FR}$ and $I_{FR}+1$, where $I_{FR}$ has been applied to the phase accumulator 210 for 72 of the 256 possible cycles and $I_{FR}+1$ has been applied for the remaining 184 cycles. As can be seen, incorporating fractionalization techniques significantly increases the frequency resolution of the DDS.

Since the integer value of $I_{FR}$ represents the rate at which phase is accumulated in the phase accumulator 210, it makes sense that $I_{FR}+1$ will accumulate phase faster than $I_{FR}$. In digital radiotelephone systems employing phase critical modulation techniques such as Gaussian Minimum Shift-Keying (GMSK) or equivalent alternatives, accumulated phase error must be accounted for and minimized. If all $I_{FR}$ states were sent to the phase accumulator 210 first, a large accumulated phase error would occur at the output of the accumulator 210. Likewise, if the remaining $I_{FR}+1$ were then sent to the accumulator 210, the accumulated phase error would decrease but would then increase again toward the end of the $I_{FR}+1$ state. With the above mentioned technique of increasing frequency resolution, the peak accumulated phase error over the fractional period can be minimized by optimally distributing $I_{FR}$ and $I_{FR}+1$.

Figure 3:
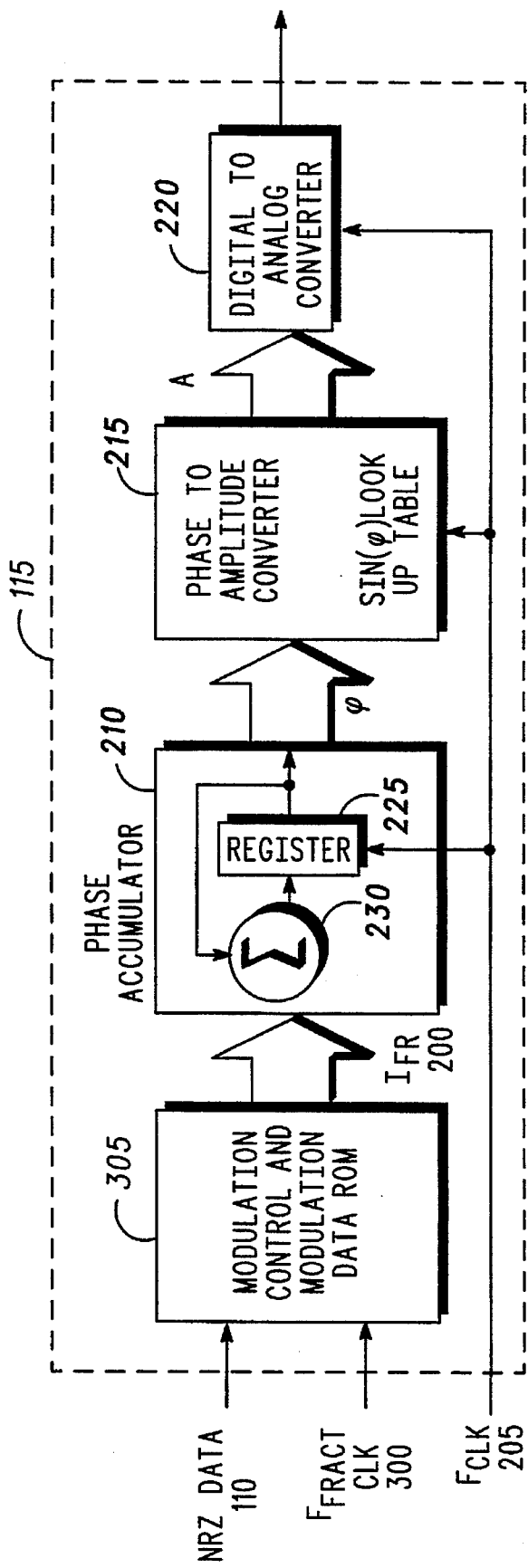
FIG. 3 generally depicts a DDS modulator in accordance with the invention.

FIG. 3 depicts implementation of the DDS into a DDS modulator in accordance with the invention. The NRZ data, which in the preferred embodiment is at a rate of 270.8333 KHz, enters a modulation control box 305. The modulation control box 305 contains a microprocessor, such as a Motorola 6800, and a conventional ROM in the preferred embodiment. The minimization of accumulated phase error is performed by software running in the microprocessor in the modulation control box 305. Recalling that $F_{FRACT}$ is required to be an integer divisor of $F_{CLK}$ and $<F_{CLK}/2$, $F_{FRACT}$ is chosen to be 8 times the NRZ data rate or 270.8333 KHz, resulting in a $F_{FRACT}$=2.1666 MHz. Minimization is achieved by starting with the $I_{FR}$ state during the first $T_{FRACT}$ period, which in the preferred embodiment is $1/F_{FRACT}$ or 0.462 µs, and incrementing $I_{FR}$ to the $I_{FR}+1$ state when the accumulated phase error over the fractional period has exceeded $$\phi_{RES} \times (F_{CLK}/F_{FRACT})°$$

which is 0.0879° in the preferred embodiment. This has the effect of distributing the $I_{FR}$ and $I_{FR}+1$ states as evenly across the fractional period as possible. Using values from the example above, the phase error associated with the $I_{FR}$ state can be calculated on a per $T_{FRACT}$ basis $$\phi_{ERROR} = [(F_{DESIRED}) - (F_{RES}I_{FR})](T_{FRACT})(360)°$$

or $$\phi_{ERROR} = [(7.2 \text{ MHz}) - (535.58 \text{ Hz} \times I_{FR})](0.1663 \text{ ms})°$$

which for $I_{FR}$ results in $$\phi_{ERROR} \, I_{FR} = 0.0251°$$

and for $I_{FR}+1$ results in $$\phi_{ERROR} \, I_{FR+1} = -0.0640°.$$

The process begins by applying the $I_{FR}$ state to the accumulator 210 during the first $T_{FRACT}$ interval, which results in a cumulative phase error of 0.0251° which is less than 0.0879°, thus the $I_{FR}$ state will be applied to the accumulator 210 during the second $T_{FRACT}$ interval. The process repeats until the cumulative phase error is greater than the 0.0879° limit, which happens after the fourth $T_{FRACT}$ interval. After the fourth $T_{FRACT}$ interval, the cumulative phase error is 0.1004°, thus the $I_{FR}+1$ state will be sent during the fifth $T_{FRACT}$ interval. The phase error for the fifth $T_{FRACT}$ interval is –0.0640° but the cumulative phase error is decreased from 0.1004° to 0.0364° by subtracting $\phi_{ERROR} \, I_{FR}+1$ for the fifth $T_{FRACT}$ interval. Since the cumulative phase error is now below the 0.0879° limit, the $I_{FR}$ state will again be applied to the accumulator during the sixth $T_{FRACT}$ interval. The minimization process repeats until all the $I_{FR}$ and $I_{FR}+1$ states have been applied to the accumulator.

The technique used to minimize the cumulative phase error can also be applied using the same approach but employing $I_{FR}$ and $I_{FR}-1$ states or any other combination of states that achieve equivalent results. The technique, as described in the example with no modulation, also increases the frequency resolution when modulation is required, since the only difference is the NRZ data stream. In this manner, frequency resolution is increased without the need for longer registers in the phase accumulator 210 or alteration of the clock frequency $F_{CLK}$ 205 used as a reference. The technique also allows for minimization of the cumulative phase error during the fractionalization process which in turn yields a more accurate modulation.

What is claimed is:

1. A frequency synthesizer having increased frequency resolution of an analog output signal, the analog output signal being synthesized in accordance with a digital control signal, the frequency synthesizer comprising:
   means for distributing a first digital input signal for a first fractional interval N and a second digital input signal for a second fractional interval D–N; and
   means, coupled to said means for distributing, for synthesizing the analog output signal.

2. The frequency synthesizer of claim 1 wherein said means for distributing comprises means for providing the first digital input signal having an integer value representing a first phase error for the first fractional interval N and the second digital input signal having an integer value representing a second phase error for the second fractional interval D–N.

3. The frequency synthesizer of claim 2 wherein said means for synthesizing comprises means for accumulating said first phase error and said second phase error to produce an accumulated phase error.

4. The frequency synthesizer of claim 3 wherein said means for synthesizing further comprises means for distributing the accumulation of said first phase error and said second phase error to minimize said accumulated phase error.

5. A frequency synthesizer having increased frequency resolution of an analog output signal, the analog output signal being synthesized in accordance with a digital input signal, the frequency synthesizer comprising:
   means for generating a first integer value for a first fractional interval N and for generating a second integer value for a second fractional interval D–N based on the digital input signal and for generating a weighted average of said first integer value and said second integer value to produce a first non-integer value; and
   means, coupled to said means for generating the weighted average, for synthesizing the analog output signal.

6. The frequency synthesizer of claim 5 wherein said means for generating the first integer value for the first fractional interval N and the second integer value for the second fractional interval D–N comprises means for generating the first integer value representing a first phase error for the first fractional interval N and the second integer value representing a second phase error for the second fractional interval D–N.

7. The frequency synthesizer of claim 6 wherein said means for synthesizing comprises means for accumulating said first phase error and said second phase error to produce an accumulated phase error.

8. The frequency synthesizer of claim 7 wherein said means for synthesizing further comprises means for distributing the accumulation of said first phase error and said second phase error to minimize said accumulated phase error.

9. A transmitter incorporating a direct digital frequency synthesizer which synthesizes an analog output signal, the transmitter comprising:
   means for generating a first integer value for a first fractional interval and for generating a second integer value for a second fractional interval based on a digital input signal corresponding to a frequency of the analog output signal and for generating a weighted average of said first integer value and said second integer value to produce a first non-integer value;
   means, coupled to said means for generating the weighted average, for synthesizing the analog output signal; and
   means, coupled to said means for synthesizing, for transmitting a radio frequency signal having a frequency related to said analog output signal.

10. The transmitter of claim 9 wherein said means for generating the first integer value for the first fractional interval and the second integer value for the second fractional interval comprises means for generating the first integer value representing a first phase error for the first fractional interval and the second integer value representing a second phase error for the second fractional interval.

11. The transmitter of claim 10 wherein said means for synthesizing comprises means for accumulating said first phase error and said second phase error to produce an accumulated phase error.

12. The transmitter of claim 11 wherein said means for synthesizing further comprises means, responsive to said means for accumulating, for distributing the accumulation of said first phase error and said second phase error to minimize said accumulated phase error.

13. The transmitter of claim 9 wherein said means for generating the first integer value for the first fractional interval and for generating the second integer value for the second fractional interval based on the digital input signal corresponding to the frequency of the analog output signal comprises means for generating the first integer value for the first fractional interval and for generating the second integer value for the second fractional interval based on the digital input signal corresponding to the modulation requirements of the analog output signal.

14. A method of increasing the frequency resolution of an analog output signal in a frequency synthesizer, the analog output signal being synthesized in accordance with a digital control signal, the method comprising the steps of:
   providing a first digital input signal for a first fractional interval N and a second digital input signal for a second fractional interval D–N; and
   distributing said first digital input signal and said second digital input signal over D fractional intervals to produce the digital control signal.

15. The method of claim 14 wherein said step of providing the first digital input signal for the first fractional interval N and the second digital input signal for the second fractional interval D–N comprises the step of providing the first digital input signal having an integer value representing a first phase error for the first fractional interval N and the second digital input signal having an integer value representing a second phase error for the second fractional interval D–N.

16. The method of claim 15 wherein said step of distributing comprises the step of accumulating said first phase error and said second phase error to produce an accumulated phase error.

17. The method of claim 16 wherein said step of distributing further comprises the step, responsive to said step of accumulating, of distributing the accumulation of said first phase error and said second phase error to minimize said accumulated phase error.

18. A method of increasing the frequency resolution of an analog output signal in a frequency synthesizer, the analog output signal being synthesized in accordance with a digital input signal, the method comprising the steps of:

generating a first integer value for a first fractional interval N and generating a second integer value for a second fractional interval D–N based on the digital input signal;

generating a weighted average of said first integer value and said second integer value to produce a first non-integer value;

providing a reference signal having a fixed frequency; and synthesizing, based on said step of generating the weighted average and said step of providing the reference signal, the analog output signal.

19. The method of claim 18 wherein said step of generating the first integer value for the first fractional interval N and the second integer value for the second fractional interval D–N comprises the step of generating the first integer value representing a first phase error for the first fractional interval N and the second integer value representing a second phase error for the second fractional interval D–N.

20. The method of claim 19 wherein said step of synthesizing comprises the step of accumulating said first phase error and said second phase error to produce an accumulated phase error.

21. The method of claim 20 wherein said step of synthesizing further comprises the step, responsive to said the step of accumulating, of distributing the accumulation of said first phase error and said second phase error to minimize said accumulated phase error.

22. A method of synthesizing an analog output signal in a frequency synthesizer incorporated in a transmitter, the method comprising the steps of:

generating a first integer value for a first fractional interval and a second integer value for a second fractional interval based on a digital input signal corresponding to a frequency of the analog output signal;

generating a weighted average of said first integer value and said second integer value to produce a first non-integer value;

providing a reference signal having a fixed frequency;

synthesizing, based on said step of generating the weighted average and said step of providing the reference signal, the analog output signal; and transmitting a radio frequency signal having a frequency related to said synthesized analog output signal.

23. The method of claim 22 wherein said step of generating the first integer value for the first fractional interval and the second integer value for the second fractional interval comprises the step of generating the first integer value representing a first phase error for the first fractional interval and the second integer value representing a second phase error for the second fractional interval.

24. The method of claim 23 wherein said step of synthesizing comprises the step of accumulating said first phase error and said second phase error to produce an accumulated phase error.

25. The method of claim 24 wherein said step of synthesizing further comprises the step, responsive to said the step of accumulating, of distributing the accumulation of said first phase error and said second phase error to minimize said accumulated phase error.

26. The method of claim 22 wherein said step of generating the first integer value for the first fractional interval and for generating the second integer value for the second fractional interval based on the distal input signal corresponding to the frequency of the analog output signal comprises the step of generating a first integer value for the first fractional interval and for generating a second integer value for the second fractional interval based on the digital input signal corresponding to the modulation requirements of the analog output signal.

* * * * *

UNITED STATES PATENT AND TRADEMARK OFFICE
CERTIFICATE OF CORRECTION

PATENT NO. : 5,495,505
DATED     : Feb. 27, 1996
INVENTOR(S) : Kundmann, Thomas J.

It is certified that error appears in the above-indentified patent and that said Letters Patent is hereby corrected as shown below:

Column 8, line 35 reads "distal input" should be --digital input--.

Signed and Sealed this

Ninth Day of July, 1996

Attest:

BRUCE LEHMAN

*Attesting Officer*     Commissioner of Patents and Trademarks